(12) United States Patent
Cole

(10) Patent No.: US 8,445,816 B2
(45) Date of Patent: May 21, 2013

(54) MODULAR PROCESS LIST FOR WELDING POWER SUPPLY

(75) Inventor: Stephen R. Cole, University Heights, OH (US)

(73) Assignee: Lincoln Global, Inc., City of Industry, CA (US)

( * ) Notice: Subject to any disclaimer, the term of this patent is extended or adjusted under 35 U.S.C. 154(b) by 679 days.

(21) Appl. No.: 12/618,393

(22) Filed: Nov. 13, 2009

(65) Prior Publication Data

US 2011/0114611 A1    May 19, 2011

(51) Int. Cl.
*B23K 9/10* (2006.01)
*B23K 9/00* (2006.01)

(52) U.S. Cl.
USPC .............. 219/130.1; 219/137 R; 219/136

(58) Field of Classification Search
None
See application file for complete search history.

(56) References Cited

U.S. PATENT DOCUMENTS

| | | | |
|---|---|---|---|
| 3,982,097 | A | 9/1976 | Seider et al. |
| 5,014,210 | A | 5/1991 | Postlewait et al. |
| 5,208,436 | A | 5/1993 | Blankenship |
| 5,276,296 | A * | 1/1994 | Kawada et al. ............... 219/116 |
| 6,327,130 | B1 | 12/2001 | Durif et al. |
| 6,563,085 | B2 | 5/2003 | Lanouette et al. |
| 6,627,849 | B2 | 9/2003 | Ihde et al. |
| 6,855,914 | B1 | 2/2005 | Kaufman et al. |
| 2007/0051711 | A1 * | 3/2007 | Kachline ................. 219/130.01 |
| 2007/0158313 | A1 | 7/2007 | Stanzel |
| 2007/0267395 | A1 | 11/2007 | Broadwater et al. |
| 2008/0053978 | A1 * | 3/2008 | Peters et al. ................ 219/130.5 |
| 2009/0212027 | A1 * | 8/2009 | Borowy et al. .......... 219/121.48 |

FOREIGN PATENT DOCUMENTS

| | | |
|---|---|---|
| EP | 1 629 926 A2 | 8/2005 |
| EP | 1 704 955 A1 | 3/2006 |
| EP | 1704955 * | 3/2006 |
| EP | 1 757 397 A1 | 8/2006 |
| EP | 1704955 * | 9/2006 |
| WO | 98/34751 A1 | 8/1998 |
| WO | 2009/105386 A1 | 8/2009 |

OTHER PUBLICATIONS

PCT/IB2010/002909 International Search Report dated Apr. 15, 2011.
PCT/IB2010/002909 Written Opinion dated Apr. 15, 2011.

* cited by examiner

*Primary Examiner* — Hoai V Ho
*Assistant Examiner* — James G Norman
(74) *Attorney, Agent, or Firm* — Hahn Loeser & Parks LLP

(57) ABSTRACT

A welding power supply includes a controller that automatically monitors the presence or absence of one or more modules connected to or installed into the welding power supply. The controller automatically turns on or off the power supply functions related to which optional modules are present. The controller populates various end-user interface menus based on which optional modules are installed. The controller uses software and/or hardware to make the determination. The optional module(s) themselves include circuitry which allows the controller to recognize when the optional module has been installed and what functions the installed optional module is capable of performing. The circuitry of the optional module(s) allows the optional module(s) to communicate with the controller. In this way, the end-user will not have the options of selecting a process on the user interface menus that is not available because the required equipment has not been installed.

18 Claims, 5 Drawing Sheets

MODULAR PROCESS LIST FOR WELDING POWER SUPPLY

TECHNICAL FIELD

The present invention pertains to controllers for welding power supplies and more particularly to controllers for welding power supplies having a graphical user interface that populates various end-user interface menus based on which modules are connected.

BACKGROUND OF THE INVENTION

It is well known in the field of welding to adjust the parameters of a welding sequence to achieve a desired result. This may include setting the welding power supply at a specific voltage or current or at a particular frequency. For some weldments, it may be desirable to achieve deep penetration of the weld joint, whereas in another application power supply settings for deep penetration may damage or destroy the adjoined materials. Accordingly, the operator may adjust one or more welding parameters to match the material and joint configuration for a particular application.

Gas Tungsten Arc Welding (GTAW) is one well known type of welding process, known also as Tungsten Inert Gas (TIG) welding. Gas-Metal-Arc-Welding (GMAW) is another well known welding process. Stick welding is yet another type of welding. Each welding process utilizes an electrode through which power is supplied from a welding power supply to establish the welding arc. Examples of welding power supplies include phase controlled, pulse width modulated and inverter power supplies. In certain welding processes, the electrode is consumed, as in the case of GMAW or Stick welding. By way of contrast, the electrode for the TIG welding process is non-consumable. In each type of welding, the welding power supply parameters are set to control the weld cycle.

Fundamentally, welding machines in general use at least two parameters to control the welding process. These include: electrode feed rate and/or current and voltage. Some GMAW welding machines also have an inductance control that affects the response of the power source or supply. Other welding parameters may include AC balance where the duty cycle of positive voltage is greater than that of the negative voltage by a particular percentage resulting in shallower arc penetration. The converse may also be true for deeper penetration. Other aspects of the welding process including arc width, or the kind of arc produced by the welding power supply, are also affected by adjusting the welding sequence or welding profile. Proper control requires that the operating parameters be set to their optimal settings for a particular application (e.g. gas mixture used, plate thickness and joint type). Prior art welding machines have required the operator to calculate setup parameters from tables or equations. Alternatively, the settings may be set based on welder experience, or by trial and error.

If the welding operator provides erroneous data, or improperly calculates the setup parameters, poor weld quality or inefficient use of the welding machine and consumables may result. Weld quality is therefore dependent upon proper setup of the welding parameters. Additionally, weld quality may be determinative of the processes that correspond with the type of components connected to the welding power supply. Traditionally, various preloaded processes are presented to an end-user via a user interface, regardless of which physical component may be connected to the welding power supply. Rather than limit the type of processes a user may utilize, systems will display the process, but limit the range those processes might have based on the connected physical component. Such a configuration may lead the end-user to select a process that is not compatible or which may not function properly if the incorrect component is installed. The selection of an incompatible process may also lead to poor weld quality.

It is therefore desirable to have a method and apparatus that helps the operator understand how changes in the welding profile will affect the welding process. Visual representations are extremely useful for this purpose; however, a graphical display dynamically showing the processes that correspond with the connected components would assist the operator in producing a higher quality and more consistent product. The embodiments of the present invention obviate the aforementioned problems, and provide a means for more producing a higher quality and more consistent product.

SUMMARY OF THE INVENTION

A welder comprises a first set of circuitry operable to establish a welding arc in a first mode of welding operation. The first set of circuitry is operable to communicate with at least a second set of circuitry for establishing a welding arc in a second substantially different mode of welding operation. The welder further comprises a user interface operable to depict a list of options selectable by an end user for engaging the welder in one or more modes of welding operation, and the welder automatically enables only the options for engaging the welder that are supported by the first and the at least a second set of circuitry when the at least a second set of circuitry is communicated with the first set of circuitry.

These and other aspects will be evident when viewed in light of the drawings, detailed description, and appended claims.

DETAILED DESCRIPTION OF THE INVENTION

Figure 1:
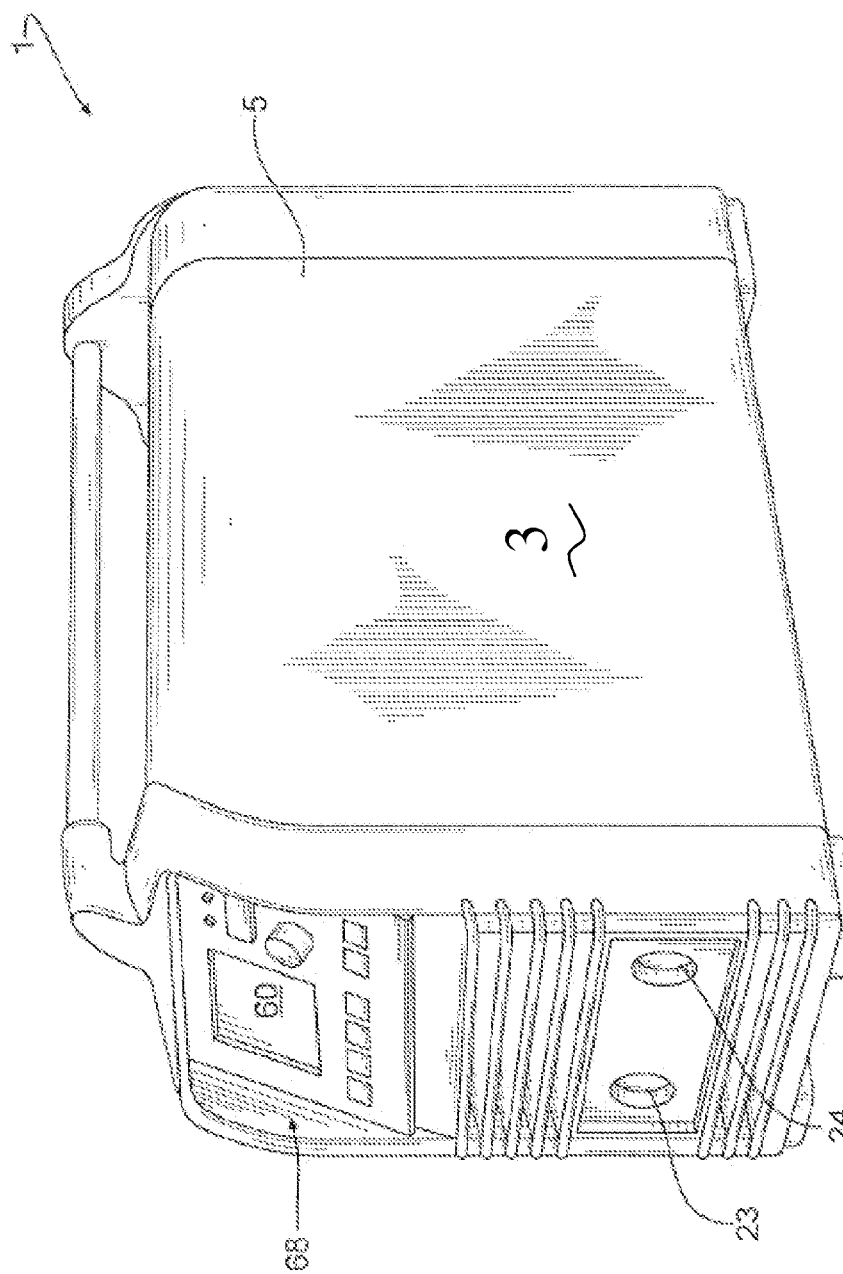
FIG. 1 is a perspective view of a welding power supply having a user interface according to the embodiments of the invention.

Referring now to the drawings wherein the showings are for purposes of illustrating embodiments of the invention only and not for purposes of limiting the same. Generally disclosed within the figures are controllers for welding power supplies having a graphical user interface that populates various end-user interface menus based on which modules are connected FIG. 1 shows a welder depicted generally at 1. The welder 1 includes a power source 3 or welding power supply 3 enclosed within a housing 5. The welding power supply 3 described hereafter is exemplary in nature, and it may be understood that the disclosure may be utilized by welding power supplies including both DC and AC output power as well as switched mode power supplies. Welding processes may include stick welding, gas metal arc welding (GMAW), gas tungsten arc welding (GTAW) and the like. The welding power supply 3 is illustrative as a switching inverter and is not intended to be limiting in any way. In the current embodiment, three phase power 6, shown by input power lines L1, L2 and L3 schematically represented in FIG. 2, may be directed to a power source rectifier 8 that produces an output signal through conductors 10, of which a DC signal may be directed to the input of an inverter 13. The inverter 13 may include a transformer 15 having primary and secondary windings in a manner well known in the art. Output from the secondary windings may be directed to rectifier 18 providing positive and/or negative supply power to power output terminals 23a, 24a, respectively, which may be connected to studs 23, 24. The welding power supply 3 may further include a power output controller 27, hereinafter referred to as controller 27, electrically communicated to the rectifier 18 for controlling output power at the studs 23, 24 during the welding process. In one embodiment, the controller 27 may include a pulse wave modulator 27'. The controller 27 may function to switch power on and off at a particular rate delivering power in the form of a square wave. The controller 27 may also be capable of alternating power delivered to the studs from between negative and positive within a range of frequencies suitable for numerous types of welding applications. It is noted here that any means for controlling power used to establish the welding arc may be chosen as is appropriate for use with the embodiments of the subject invention. Welding cables 33, 34 may be connected to the welding power supply 3, and more specifically to the studs 23, 24, for delivering welding current to a work piece 51, through an electrode 45, and work piece connector. In the case of TIG welding, the electrode 45 may comprise a generally non-consumable core made of Tungsten or other material. Alternatively for Gas Metal Arc Welding (GMAW), the electrode 45 may include welding wire supplied from a continuous source, such as a wire feeder, not shown. A contact tip may function to retain the electrode 45 which may be connected to a first welding cable 33. Accordingly, welding cable 34 may include a work piece connector for electrically connecting the welding cable 34 to the work piece 51. Of course, persons of ordinary skill in the art will understand that the electrodes for stick welding, TIG, GMAW and the like will vary with each process.

Figure 2:
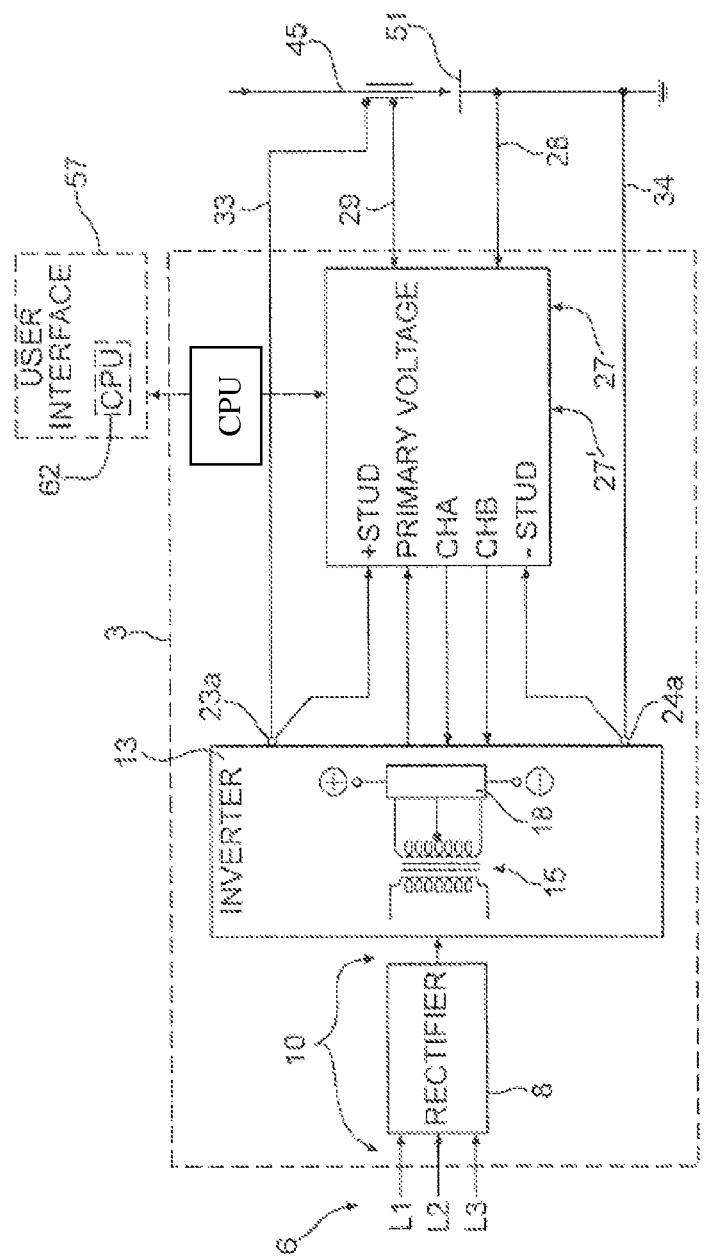
FIG. 2 is a schematic representation of a welding power supply including the power supply controller, an intermediary controller and user interface according to the embodiments of the invention.

With continued reference to FIG. 2, output from the rectifier 18 may be controlled via switching devices, which may be semiconductor switching devices such as SCRs (Silicon Controlled Rectifiers) or any other switching device chosen with sound engineering judgment. Multiple switching devices oriented in a bridge configuration may be utilized. The rate and order at which the switching devices are turned on and off may be controlled by controller 27. In this manner, signals from the controller 27 may cause the semiconductor switching devices to cycle at predetermined intervals, which may result in a waveform, as determined by the welding profile adjusted during machine setup. To facilitate control over the semiconductor switching devices, the controller 27 may incorporate a digital signal processor, which may utilize a logic processor for controlling the intervals at which the semiconductor devices are cycled. In one embodiment, the logic processor may comprise a microprocessor and static and/or dynamic memory, as well as additional peripheral support circuitry, for storing and logically processing various data. A programmed algorithm may also be incorporated into the controller 27 and executed by the microprocessor for controlling the output waveform. To monitor the welding power supply 3, voltage sense leads 28, 29 may be connected to the electrode 45 and work piece 51, respectively. Feedback signals from the sense leads may be communicated to the controller 27 for use in adjusting the power output signal in compensating for power losses as may be incurred, for example, from the welding cables, switching devices and the like. In this way, a welding sequence or a welding profile may be implemented to control the current across electrode E and work piece W at each instance of the welding process. Operation of the welder 1 in this way will successfully control the inverter 13 by way of controller 27 to produce the desired waveform in the welding process.

Figure 3:
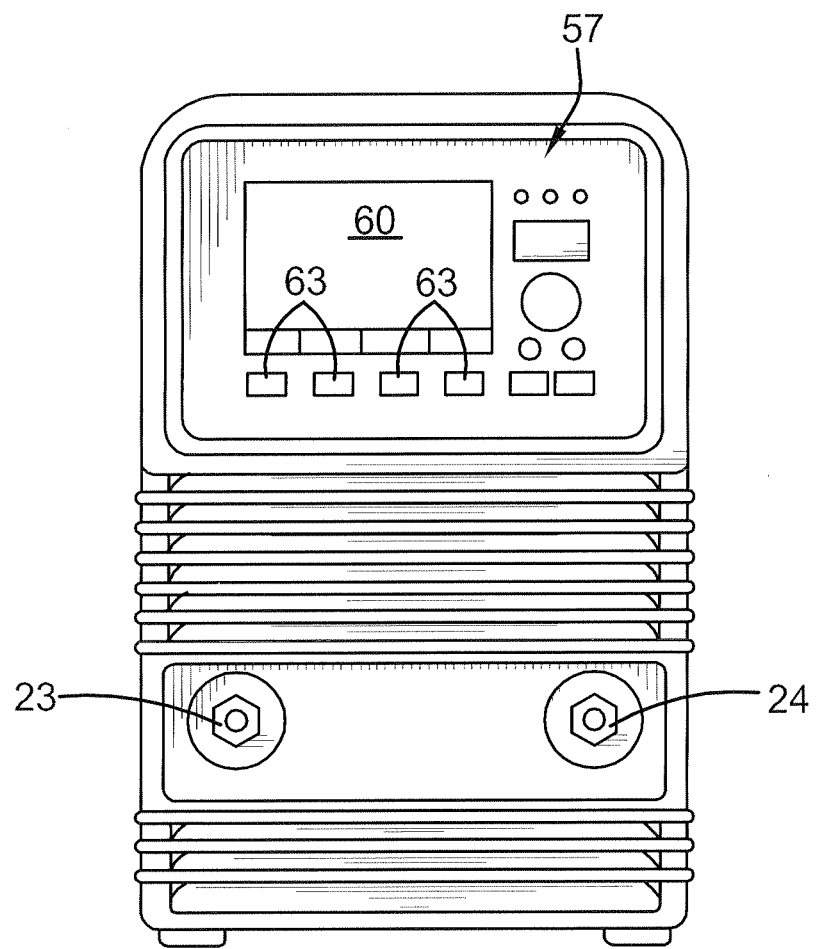
FIG. 3 is a front view of a welding power supply operator panel and user interface showing the default processes prior to connecting a modular component (not shown) according to the embodiments of the invention.

With reference now to FIG. 3, the welder 1 may include a user interface 57 for adjusting one or more parameters of the power supply 3 in establishing and maintaining the welding arc. The user interface 57 may include a display 60 received into a console 68 for housing the display 60. The display 60 may include a luminescent screen having an array or matrix of pixels for depicting text and/or graphical images. The display 60 may be activated by electronic circuitry including display memory and a logic processor 62 or microprocessor 62, not shown. It is noted here that the microprocessor 62 used for the display 60 may be a separate microprocessor from that used in the controller 27. The display 60 may further include soft keys 63 used to enter information into the user interface 57 for selecting the mode and/or adjusting the profile of the welding cycle. As soft keys in general are programmable, other welder 1 functions may be selected or initiated by depressing the same soft key 63 at different times during machine set up or operation. As further illustrated in FIG. 3, the display 60 may display various selectable, permissible welding processes or data to the end-user. Each displayed welding process may be dependent upon a modular component or components (not shown) which may be connected to the welder 1 or the power supply 3. The modular component may include components for performing welding operations. Such modular components may include, but are not limited to, welding guns, welding wire (i.e. nickel alloy), helmets, or other components chosen with sound engineering judgment.

Figure 3A:
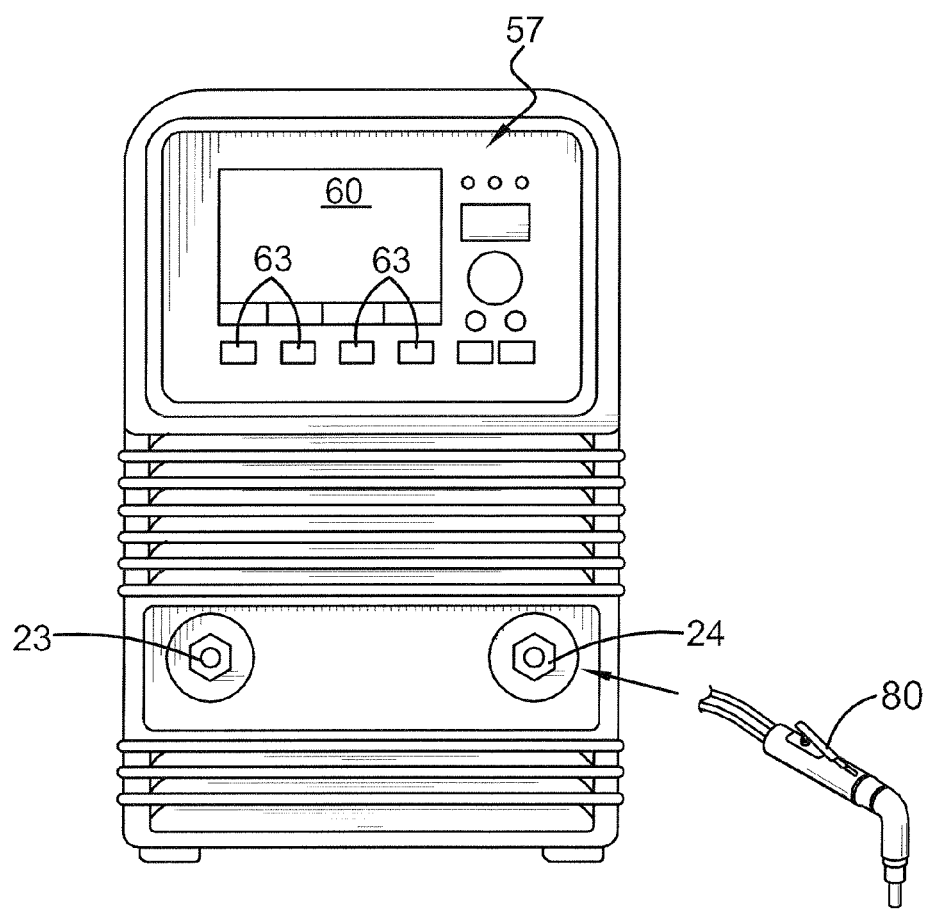
FIG. 3A is a front view of the welding power supply shown in FIG. 3, displaying an additional process with a now-connected modular component (not shown) according to the embodiments of the invention.

With reference to FIG. 3A, in one instance, the modular component may be a welding gun. This welding gun may include an identifier unique to the type of welding gun, for example a TIG or MIG gun. The unique identifier may be, for example, an embedded code, a numerical sequence, or firmware. The unique identifier may sensed by a means for sensing connected to the microprocessor 62 via a communication data bus (i.e., a field bus), via a network, a hard wire (i.e., Ethernet), wireless, infrared, or by other means chosen with sound engineering judgment. The identifier may be preloaded in the modular component's memory source or may be using an stored in an external source (i.e., scanable product code), which may be affixed to the modular component or the power supply 3.

Figure 4:
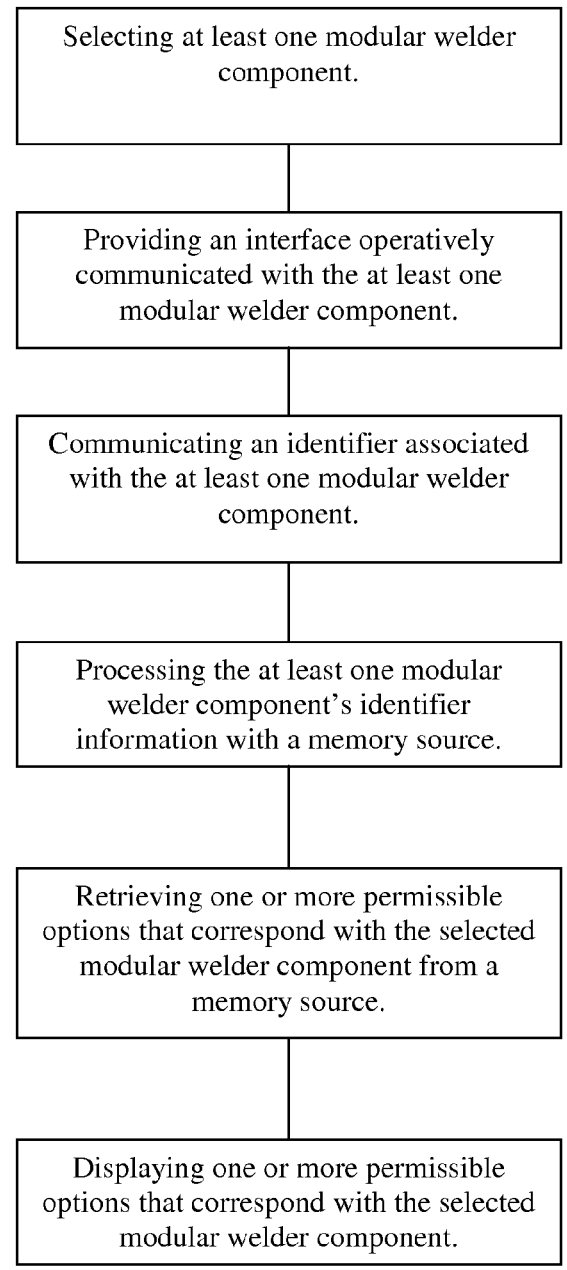
FIG. 4 is a flow chart showing the method of operating a welder according to the embodiments of the invention.

With continued reference to FIG. 3, FIG. 3A and now FIG. 4, the microprocessor 62 may communicate with the welding gun 80, which may be connected to the power supply 3. After connecting the welding gun 80 to the power supply 3, the welding gun 80 may communicate its identifier to the power supply 3 via the microprocessor 62. The microprocessor 62 may then process the identifier information, which may include verifying compatibility of the welding gun 80 with the power supply 3, determining whether the connection between the welding gun 80 is either partially or fully established, or whether the welding gun 80 is functional. For example, if the connection with the welding gun 80 is not fully established, the microprocessor 62 may communicate information (i.e., textually, graphically, or audibly) to the end-user that a fully established connection is not available between the power supply 3 and the welding gun 80. This information may be displayed using the display 60. Additionally, the microprocessor 62 may communicate information informing the end-user that the welding gun 80 is defective or that there may be an interference in the communication process. However, after establishing connection to the welding gun 80, the microprocessor 62 may query the power supply memory source (not shown) to gather various welding process information corresponding to the connected welding gun 80. After gathering the corresponding process information, as illustrated in FIG. 3A, the display 60 may list processes corresponding to the now-connected welding gun 80. The selectable welding processes displayed in FIG. 3A may differ from those processes displayed in FIG. 3, as no welding gun 80 is attached to the power supply 3 therein. After the power supply memory source is queried, the power supply memory source may communicate those welding processes which may be performed by the welding gun 80 to the end-user by listing the processes on the display 60.

With continued reference to FIG. 3, upon start up of the welder, the display 60 may display default processes that are available to the end-user. For example, when a MIG welding gun is attached to the power supply 3, the welding processes displayed may be limited to processes that correspond with the connected MIG welding gun. In contrast, those processes that are not capable of being performed with the selected torch are not displayed. Additionally, the power supply memory source, and the modular component memory source may include, without limitation, non-volatile memory, flash memory, a database accessed via network, or any other memory source chosen with sound engineering judgment.

Now turning to FIG. 4, an exemplary but not limiting example is now illustrated, where an end-user may be welding with a nickel alloy electrode which may be wound on a reel. The reel may include, for example, an unique identifier provided in the form of a bar code label, which may be sensed by a means for sensing associated with the power supply 3 It is envisioned that the bar code label may contain information associated with the nickel alloy electrode, including the chemical composition of the wire, the wire diameter, melting temperature of the wire, etc. The microprocessor may then process the information gathered from the bar code label, query the power supply memory source, and then gather a list of welding processes corresponding to the welding electrode from the power supply memory source. The microprocessor 62 may then communicate the list of processes to the display 60, which may display a list of those processes that may be performed with the nickel alloy electrode. Displaying welding processes which may be performed using the nickel alloy electrode may reduce the probability of the end-user selecting a welding processes that may not be performed with a nickel alloy electrode.

In another example, when modular components A and B are connected to the power supply 3, the display 60 may display only processes that may be performed using modular components A and B. The end-user may not have access to any additional processes that may require different modular components. For example, welding processes that require the combination of components A and C or components A, B, and C may not be displayed. Additionally, if the combination of A and B is incompatible for performing a welding operation, the end-user may be alerted to install or remove additional modular components. Prior art devices permit all processes for any combination of modular components to be displayed to the end-user, allowing the end-user to select a process not supported by the connected modular components A, B and C. A failure to alert the end-user about the missing modular components or selecting inoperable processes may result in an unexpected error or a weld of poor quality. By limiting the list of displayed processes to only those processes which may be performed by the connected modular components, the risk of selecting inoperable processes are reduced.

In a further example, the modular component may be a welding gas. For example, the welding gas may be, without limitation, argon, nitrogen, carbon dioxide, or combinations thereof. A sensor may detect the gas and then communicate the gas with the microprocessor 62. Therefore, the processes displayed may be those which may be performed using the detected gas. It should be noted that the power supply memory source may be preloaded or subsequently loaded with welding processes that for performing a welding operation.

In an alternate embodiment, the processes which may be performed with the connected modular component(s) may be communicated with the microprocessor 62 from a modular component memory source. That is, rather than storing potential welding processes within the microprocessor memory, the welding processes which may be performed by the attached modular component may be preloaded into the modular component memory source. After the modular component is detected or sensed by the microprocessor, the processes preloaded on the modular component may communicate with the power supply memory source. The power supply memory source may then be updated with modular component memory source processes and may communicate the processes that correspond with now attached modular component with the user interface. Additional processes that do not correspond with the connected modular component may not be communicated with the user interface from the updated power supply memory source.

By way of example, steel electrode processes may be preloaded into the memory source. After a nickel alloy electrode is connected to the power supply 3, the steel material processes may be removed from the power supply memory source, leaving the nickel alloy electrode welding processes to be displayed to the end-user, which further reduces the possibility of selecting an inoperable process, and may be beneficial when multiple modular component are subsequently connected to the power supply 3 for performing various welding operations. When the end-user connects an additional welding gun for performing the welding operation, the end-user may not experience memory congestion during the welding operation. The congestion may be due to a lack of the power supply memory capacity. By removing any inoperable processes from the power supply memory source, the power supply memory source may be capable of supporting numerous modular components connected to the power supply, in an effort to perform the desired welding operation. The power supply 3 utilizing this embodiment may be a specialized power supply 3, which may have the ability with a focus on performing more specific and complex welding operations, for example an STT welding process.

A method of operating a welder may comprises the steps of selecting at least one modular welder component thereby composing a welder for establishing a welding arc used in a welding process, providing a user interface operatively communicated to the at least one modular welder component, the user interface being operable to display options selectable by an end user for engaging the welder in the welding process;

and displaying a list of permissible options on the user interface corresponding to the at least one selected modular welder components.

The method of operating a welder may further comprises the steps of interchanging at least one of the at least one modular welder component for establishing welding arc used in a second substantially different welding process, detecting the interchanged modular welder component; and automatically updating the list of permissible options for engaging the welder corresponding to the interchanged modular welder component.

It is envisioned that the user interface may comprises a display screen that displays one or more welding processes for engaging the welder that are supported by the selection of modular welder components.

In another aspect, the at least one modular welder component may comprises a first set of circuitry operable to establish a welding arc in a first mode of welding operation. It is further envisioned that the at least one modular welder component may further comprise a second set of circuitry for establishing a welding arc in a second substantially different mode of welding operation. Additionally, the at least one modular welder component may further comprise a second set of circuitry for establishing a welding arc in a surface-tension-transfer mode of welding operation.

In another aspect of the method of operating a welder, the step of displaying a list of permissible options on the user interface corresponding to the at least one selected modular welder components may comprise the steps of scanning at least one of the modular welder components for determining a set of welding processes supported by the at least one of the modular welder components and displaying a list of permissible options on the user interface corresponding to the set of welding processes at least one selected modular welder components In still another aspect of the method of operating a welder, the at least one of the modular welder components includes a scan-able identifier for identifying the set of welding processes supported by the at least one of the modular welder components. The method of operating a welder may further comprise further comprising the step of providing a sensor for scanning at least one of the modular welder components. It is also envisioned that the at least one of the modular welder components includes a scan-able label.

In another embodiment, a welder may comprise a first set of circuitry operable to establish a welding arc in a first mode of welding operation, said first set of circuitry being operable to communicate with at least a second set of circuitry for establishing a welding arc in a second substantially different mode of welding operation. The welder may also comprise a user interface operable to depict a list of options selectable by an end user for engaging the welder in one or more modes of welding operation, wherein the welder automatically enables only the options for engaging the welder that are supported by the first and the at least a second set of circuitry when the at least a second set of circuitry is communicated with the first set of circuitry.

In one aspect of the welder, the user interface may includes a display screen and may display only those options on the display screen that are supported by the first set of circuitry and the at least a second set of circuitry.

In another aspect of the welder, the first set of circuitry comprises circuitry for rectifying associated power input into the welder.

In a still further aspect of the welder, the at least a second set of circuitry may comprise circuitry that signal conditions the rectified power input into the welder and generates an output that defines the second substantially different mode of welding operation.

In yet another aspect of the welder, the at least a second set of circuitry may comprise circuitry that signal conditions the rectified power input into the welder and generates an output that defines a surface-tension-transfer mode of welding operation.

In a still further aspect of the welder, the at least a third set of circuitry may comprise circuitry that signal conditions the rectified power input into the welder and generates an output that defines the third substantially different mode of welding operation.

In another embodiment, a welding system may comprise a first welder component including circuitry for establishing a welding arc, a second interchangeable welder component used in conjunction with the first welder component for engaging the welding system to perform at least a first welding process, the second interchangeable welder component having a scan-able identifier for determining a set of welding processes supported by the second interchangeable welder component, means for sensing the scan-able identifier, and a user interface including a display for depicting a list of options selectable by an end user for engaging the welding system to perform the at least a first welding process, wherein the welding system automatically depicts the list of options corresponding to the set of welding processes supported by the second interchangeable welder component.

In one aspect of the welding system, the means for sensing may comprise a sensor operatively communicated to the user interface, wherein the sensor is operable to wirelessly communicate information regarding the scan-able identifier.

In another aspect of the welding system, the second interchangeable welder component may include signal conditioning circuitry for supporting a set of welding processes.

In still another aspect of the welding system, wherein the second interchangeable welder component may include signal conditioning circuitry for supporting a surface-tension-transfer mode of welding operation.

In yet a further aspect of the welding system, the user interface may automatically depict the list of options when the second interchangeable welder component is sensed by said means for sensing.

In another embodiment, a method of operating a welder may comprise the steps of selecting at least a first welder component composing a welder for establishing a welding arc used in a welding process, wherein the welder includes a first set of data, providing a modular welder component having a second set of data not included in the first set of data, updating the first set of data with at least a portion of the second set of data to form an updated first set of data, providing a user interface operatively communicated with the at least a first welder component, the user interface being operable to display options selectable by an end user for engaging the welder in the welding process, and displaying a list of selectable options on the user interface corresponding to the updated first set of data.

The invention has been described herein with reference to the preferred embodiment. Modifications and alterations will occur to others upon a reading and understanding of this specification. It is intended to include all such modifications and alternations insofar as they come within the scope of the appended claims or the equivalents thereof.

What is claimed is:

1. A method of operating a welder, comprising the steps of:
    selecting at least one modular welder component thereby composing a welder for establishing a welding arc used in a welding process by connection to a power supply;
    querying a power supply memory to gather various welding process information corresponding to said connected at least one modular welder component;
    providing a user interface operatively communicated with the at least one modular welder component, the user interface being operable to display options selectable by an end user for engaging the welder in the welding process, said display options specific to said connected at least one modular welder component and said power supply;
    providing a memory source operatively communicated with the user interface, the memory source storing a list of options for engaging the welder in at least two different welding processes; and
    displaying a list of selectable options on the user interface corresponding to the unique combination of said at least one selected modular welder components and said power supply; and further wherein
    the at least one modular welder component comprises a first set of circuitry operable to establish a welding arc in a first mode of welding operation; and
    the at least one modular welder component further comprises a second set of circuitry for establishing a welding arc in a second substantially different mode of welding operation.

2. The method as defined in claim 1, further comprising the step of:
    interchanging at least one of the at least one modular welder component for establishing welding arc used in a second substantially different welding process;
    detecting the interchanged modular welder component; and,
    automatically updating the list of permissible options for engaging the welder corresponding to the interchanged modular welder.

3. The method as defined in claim 1, wherein
    the user interface comprises a display screen that displays one or more welding processes for engaging the welder that are supported by the selection of modular welder components.

4. The method as defined in claim 1, wherein
    the at least one modular welder component further comprises a second set of circuitry for establishing a welding arc in a surface-tension-transfer mode of welding operation.

5. The method as defined in claim 1, wherein
    the at least one modular welder component further comprises a third set of circuitry for establishing a welding arc in a third substantially different mode of welding operation.

6. The method as defined in claim 1, wherein
    the step of displaying a list of permissible options on the user interface corresponding to the at least one selected modular welder components, comprises the step of:
    scanning at least one of the modular welder components for determining a set of welding processes supported by the at least one of the modular welder components; and,
    displaying a list of permissible options on the user interface corresponding to the set of welding processes at least one selected modular welder components.

7. The method as defined in claim 6, wherein
    the at least one of the modular welder components includes a scannable identifier for identifying the set of welding processes supported by the at least one of the modular welder components.

8. The method as defined in claim 7, further comprising the step of:
    providing a sensor for scanning at least one of the modular welder components.

9. The method as defined in claim 8, wherein
    the at least one of the modular welder components includes a scannable label.

10. A welder, comprising:
    a first set of circuitry operable to establish a welding arc in a first mode of welding operation, said first set of circuitry being operable to communicate with at least a second set of circuitry for establishing a welding arc in a second substantially different mode of welding operation;
    an interface operable to depict a list of options selectable by an end user for engaging the welder in one or more modes of welding operation, wherein the welder automatically enables only the options for engaging the welder that are supported by the first and the at least a second set of circuitry when the at least a second set of circuitry is communicated with the first set of circuitry;
    said user interface further comprising a display screen; and further wherein
    the user interface displays only those options on the display screen that are supported by the first set of circuitry and the at least a second set of circuitry,
    said options on the display screen derived from communication with a welding component or a welding power supply with said first or second set of circuitry.

11. The welder as defined in claim 10, wherein
    the first set of circuitry comprises circuitry for rectifying associated power input into the welder.

12. The welder as defined in claim 11, wherein
    the at least a second set of circuitry comprises circuitry that signal conditions the rectified power input into the welder and generates an output that defines the second substantially different mode of welding operation.

13. The welder as defined in claim 11, wherein
    the at least a second set of circuitry comprises circuitry that signal conditions the rectified power input into the welder and generates an output that defines a surface-tension-transfer mode of welding operation.

14. A welding system, comprising:
    a first welder component including circuitry for establishing a welding arc;
    a second interchangeable welder component used in conjunction with the first welder component for engaging the welding system to perform at least a first welding process, the second interchangeable welder component having a scannable identifier for determining a set of welding processes supported by the second interchangeable welder component;
    means for sensing the scannable identifier, said means for sensing comprises a sensor operatively communicated to the user interface, wherein the sensor is operable to communicate information regarding the scannable identifier; and,
    a interface including a display for depicting a list of options selectable by an end user for engaging the welding system to perform the at least a first welding process, wherein the welding system automatically depicts the list of options corresponding to the set of welding processes supported by the second interchangeable welder component.

15. The welding system as defined 14, wherein the second interchangeable welder component includes signal conditioning circuitry for supporting a set of welding processes.

16. The welding system as defined 14, wherein the second interchangeable welder component includes signal conditioning circuitry for supporting a surface-tension-transfer mode of welding operation.

17. The welding system as defined in claim 14, wherein the user interface automatically depicts the list of options when the second interchangeable welder component is sensed by said means for sensing.

18. A method of operating a welder, comprising the steps of:

selecting at least a first welder component composing a welder for establishing a welding arc used in a welding process, wherein the welder includes a first set of data;

providing a modular welder component having a second set of data not included in the first set of data;

updating the first set of data with at least a portion of the second set of data to form an updated first set of data;

providing a user interface operatively communicated with the at least a first welder component, the user interface being operable to display options selectable by an end user for engaging the welder in the welding process; and displaying a list of selectable options on the user interface corresponding to the updated first set of data.

\* \* \* \* \*